United States Patent
Nagaishi et al.

(10) Patent No.: US 6,966,304 B2
(45) Date of Patent: Nov. 22, 2005

(54) ESTIMATION OF OIL-DILUTING FUEL QUANTITY OF ENGINE

(75) Inventors: Hatsuo Nagaishi, Yokohama (JP); Takashi Nakazawa, Kawasaki (JP); Kazuhiko Abe, Kawasaki (JP)

(73) Assignee: Nissan Motor Co., Ltd., Yokohama (JP)

(*) Notice: Subject to any disclaimer, the term of this patent is extended or adjusted under 35 U.S.C. 154(b) by 43 days.

(21) Appl. No.: 10/686,482

(22) Filed: Oct. 16, 2003

(65) Prior Publication Data

US 2004/0099252 A1 May 27, 2004

(30) Foreign Application Priority Data

Oct. 17, 2002 (JP) .............................. 2002-302614
Dec. 17, 2002 (JP) .............................. 2002-364742

(51) Int. Cl.$^7$ .......................... F02D 41/04; F01M 11/00
(52) U.S. Cl. .................. 123/480; 123/494; 123/196 R; 123/294
(58) Field of Search ............................. 123/478, 480, 123/494, 294, 295, 305, 501, 502, 196 R, 123/196 S

(56) References Cited

U.S. PATENT DOCUMENTS

| | | | |
|---|---|---|---|
| 6,739,320 B2 * | 5/2004 | Ito et al. | 12/674 |
| 6,810,858 B2 * | 11/2004 | Ito et al. | 123/478 |
| 2002/0007817 A1 | 1/2002 | Ueda et al. | |
| 2004/0181331 A1 * | 9/2004 | Nagaishi et al. | 701/104 |
| 2004/0182378 A1 * | 9/2004 | Oshimi et al. | 123/685 |

FOREIGN PATENT DOCUMENTS

| | | | | |
|---|---|---|---|---|
| JP | 2002-13428 | | 1/2002 | |
| JP | 2004-137953 | * | 5/2004 | ............ F02D 45/00 |
| JP | 2004-197591 | * | 7/2004 | ............ F02D 45/00 |
| JP | 2004-346881 | * | 12/2004 | ............ F02D 41/04 |

* cited by examiner

Primary Examiner—Hai Huynh
(74) Attorney, Agent, or Firm—Foley & Lardner LLP

(57) ABSTRACT

Apparatus for an internal combustion engine includes an estimating or controlling unit to determine an oil-diluting fuel quantity of an engine oil-diluting fuel which is fuel leaking out through a clearance between a piston and a cylinder of the engine and diluting an engine oil. The unit calculates a variation of the engine oil-diluting fuel quantity, and determines the oil-diluting fuel quantity in accordance with the variation.

27 Claims, 15 Drawing Sheets

MOFD MAP

LOAD CORRECTION TABLE

TTWS CALCULATION TABLE

TTCT CALCULATION TABLE

TTCN CALCULATION TABLE

TTAVSP CALCULATION TABLE

ESTIMATION OF OIL-DILUTING FUEL QUANTITY OF ENGINE

BACKGROUND OF THE INVENTION

The present invention relates to technique for estimating an oil-diluting fuel quantity of an internal combustion engine and/or technique for controlling an internal combustion engine with an estimated oil-diluting fuel quantity.

In an internal combustion engine, fuel may leak out through the clearance between a piston and a cylinder, and dilutes oil.

U.S. Patent Application Publication US2002/0007817A1 (corresponding to Published Japanese Patent Application Kokai Publication No. 2002-13428) shows an incylinder direct fuel injection type internal combustion engine arranged to adjust a fuel injection start timing in accordance with a parameter representing adhesiveness of fuel in fuel injection on intake stroke.

SUMMARY OF THE INVENTION

However, the engine system of the above-mentioned type takes no account of a quantity of fuel leaking through a clearance between a piston and a cylinder and diluting an engine oil, and hence tends to receive adverse influence of such fuel on engine operation.

It is an object of the present invention to provide technique of estimating an oil-diluting fuel quantity accurately.

According to one aspect of the present invention, an apparatus for an internal combustion engine, comprises: a variation calculating section to calculate a variation of an engine oil-diluting fuel which is fuel leaking out through a clearance between a piston and a cylinder of the engine and diluting an engine oil; and an oil-diluting fuel quantity calculating section to determine an oil-diluting fuel quantity in accordance with the variation.

According to another aspect of the present invention, a process comprises: calculating a variation of an engine oil-diluting fuel which is fuel leaking out through a clearance between a piston and a cylinder of the engine and diluting an engine oil; and determining an oil-diluting fuel quantity in accordance with the variation.

According to another aspect of the present invention, an engine control system comprises: an input section to sense an engine operating condition; a control unit to calculate a variation of an engine oil-diluting fuel, to determine an oil-diluting fuel quantity in accordance with the variation, and to produce a control signal by using the oil diluting fuel quantity; and an output section to control the engine in response to the control signal.

According to still another aspect of the invention, an apparatus comprises: means for calculating a variation of an engine oil-diluting fuel quantity successively in accordance with an engine temperature; and means for determining the oil-diluting fuel quantity in accordance with successively calculated values of the variation.

DETAILED DESCRIPTION OF THE INVENTION

Figure 1:
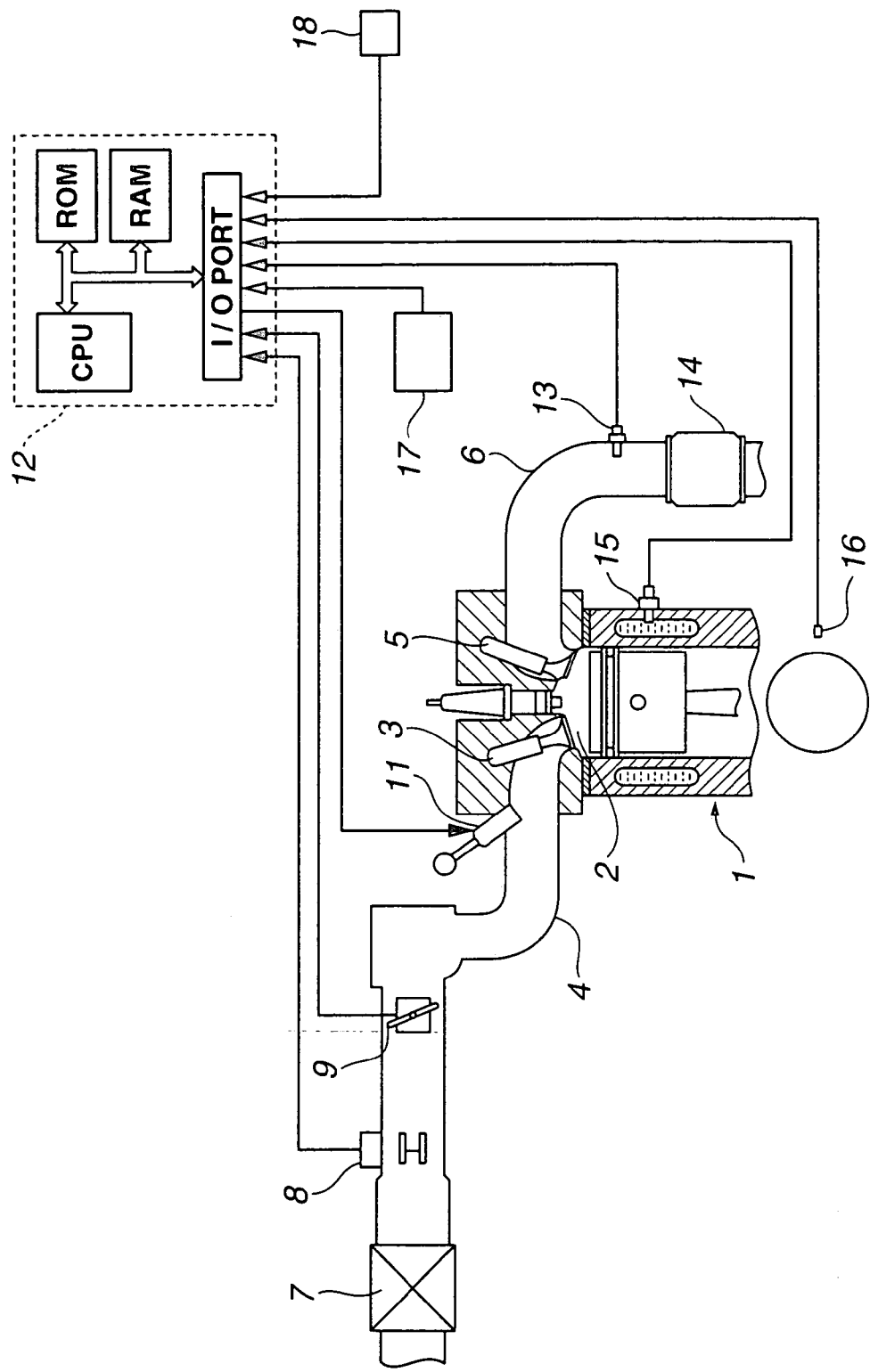
FIG. 1 is a schematic view showing an engine system according to a first embodiment of the present invention.

FIG. 1 shows an engine system according to a first embodiment of the present invention.

An engine main block 1 includes at least one combustion chamber 2 with which an intake passage 4 is connected through an intake valve 3, and an exhaust passage 6 is connected through an exhaust valve 5.

In intake passage 4, there are provided an air cleaner 7, an air flowmeter 8 for sensing an intake air quantity, a throttle valve 9 for regulating the intake air quantity, and a fuel injector 11 for injecting fuel in the intake air.

An engine control unit (ECU) 12 produces a fuel injection command signal, and commands fuel injector 11 to inject fuel into the intake air to achieve a desired air fuel ratio in accordance with engine operating conditions.

In exhaust passage 6, there are provided an oxygen sensor 13 for sensing an oxygen concentration in the exhaust gas mixture, and a three-way catalyst 14. Three-way catalyst 14 can convert harmful emissions of hydrocarbons, carbon monoxide, and oxides of nitrogen into less harmful gases with a maximum conversion efficiency in a window of the air fuel ratio around the stoichiometry. Therefore, ECU 12 controls the air fuel ratio of the engine in a feedback control mode based on the output of oxygen sensor 13 located on the upstream side of three-way catalyst 14 so that the actual air fuel ratio swings periodically within the air fuel ratio window.

A water temperature sensor 15 senses the temperature of an engine cooling water in engine main block 1. A crank angle sensor 16 senses an engine speed of the engine. An outside air temperature sensor 17 senses an outside air temperature. A vehicle speed sensor 18 senses a vehicle speed of the vehicle including, as a prime move, this engine system. ECU 12 is connected with these sensors, and arranged to receive information from these sensors.

When part of fuel adheres to a cylinder inside wall surface and leaks through a clearance between the piston and cylinder during an engine operation, the engine oil is diluted by the leakage fuel. In case of such dilution, the amount of fuel to be burned in combustion chamber 2 is decreased, and the air fuel ratio might become so lean (air rich) as to exert adverse influence on the drivability and emission control. It is difficult or practically impossible to prevent the oil dilution of fuel by control of the fuel injection timing as in the system of the earlier technology. Moreover, if the oil-diluting fuel evaporates from the engine oil and enters the intake system by being sucked through a blowby system, the air fuel ratio might become so rich (fuel rich) as to exert adverse influence on the drivability and emission control.

Therefore, the engine system shown in FIG. 1 serves as an oil-diluting fuel quantity estimating apparatus, and estimates the oil-diluting fuel quantity OF of fuel mixed in engine oil in the following manner.

Figure 2:
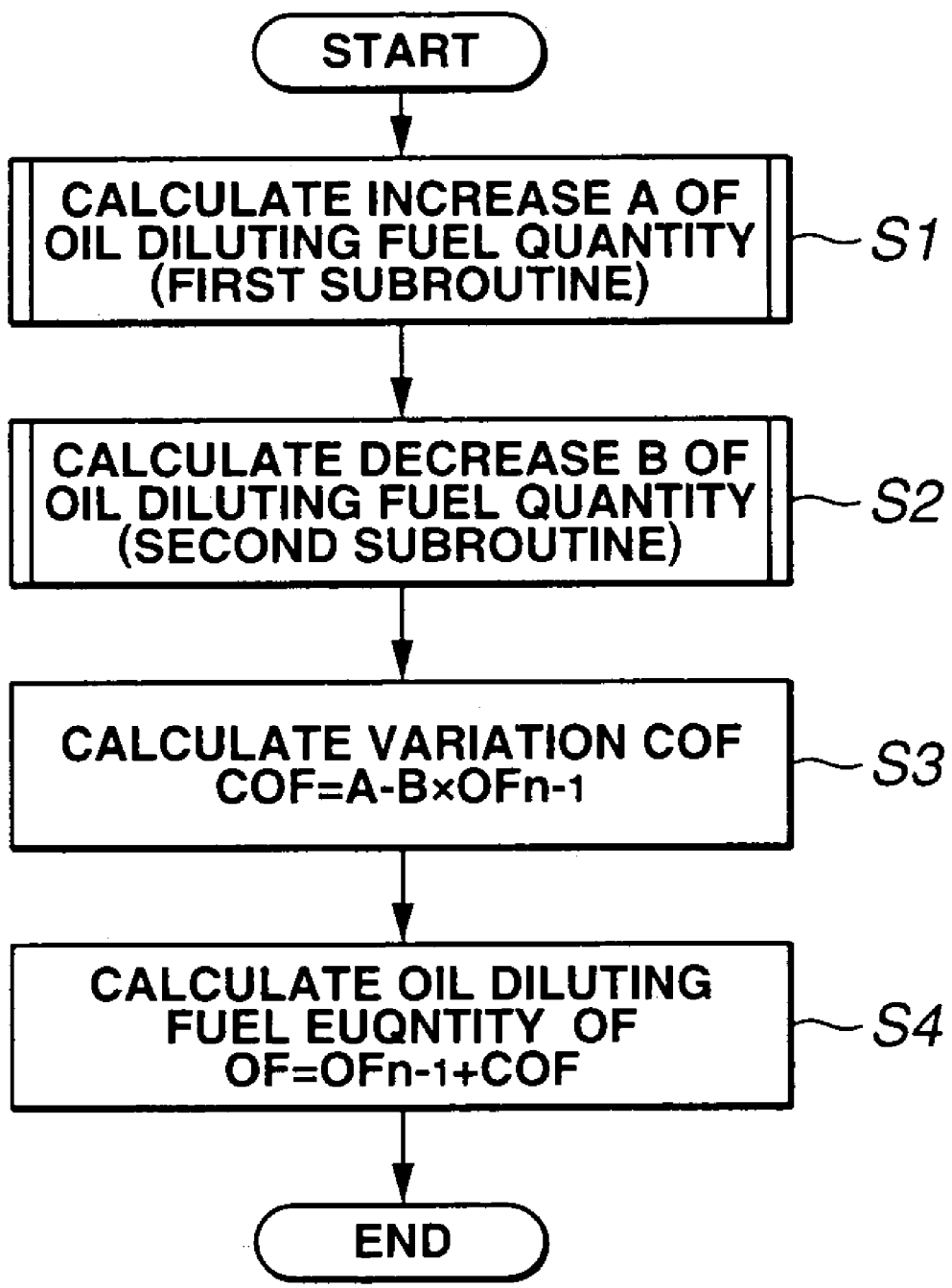
FIG. 2 is a flowchart showing an oil-diluting fuel quantity estimating process performed by the engine system of FIG. 1.

FIG. 2 shows a process for determining an oil-diluting fuel quantity OF, according to the first embodiment of the present invention. This process is performed at regular time intervals of a predetermined time length.

Step S1 calculates an increase quantity (or increase) A of an oil-diluting fuel quantity according to a first subroutine as mentioned later. Step S2 calculates a decrease rate B of the oil-diluting fuel quantity according to a second subroutine as mentioned later. Step S3 calculates a variation quantity COF of the oil-diluting fuel quantity by using the increase quantity A calculated at S1 and the decrease rate B calculated at S2. In this example, COF=A−B×OFn−1. The quantity B×OFn−1 corresponds to a decrease quantity. In this equation, OFn−1 is a previous value of the oil-diluting fuel quantity OF calculated in a previous cycle. Step S4 calculates the oil-diluting fuel quantity OF. In this example, OF=OFn−1+COF. Engine control unit (ECU) 12 serves as a main component of an oil-diluting fuel quantity estimating system, and calculates the oil-diluting fuel quantity by integrating or accumulating the variation which corresponds to at least one of the increase quantity A, the decrease rate or decrease quantity B or B×OFn−1, and the variation quantity COF. In this example, the oil-diluting fuel quantity is determined by integrating or accumulating the periodically determined values of the variation quantity, or the increase and decrease quantities A and B.

Figure 3:
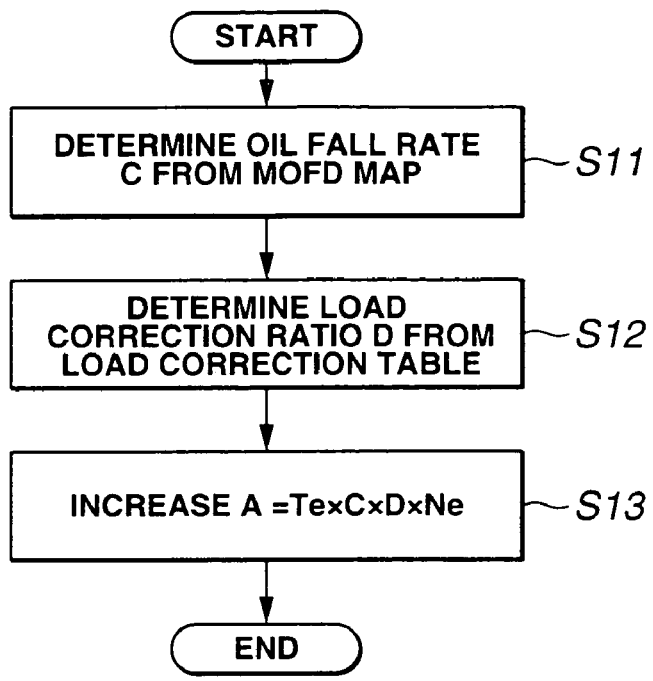
FIG. 3 is a flowchart showing a first subroutine of step S1 of FIG. 2.
Figure 4:
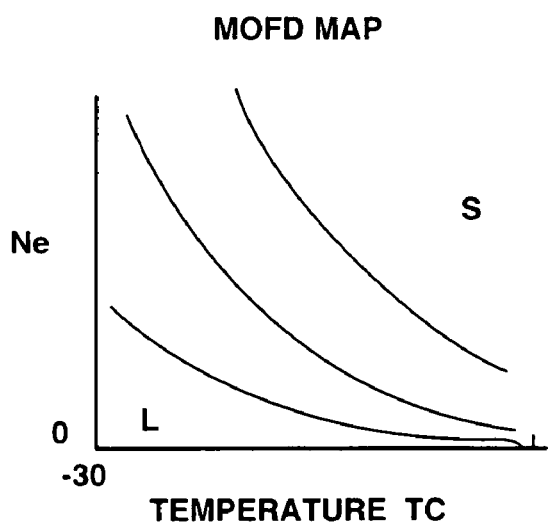
FIG. 4 is a graph illustrating a MOFD map used in the first subroutine of FIG. 3.

FIG. 3 shows the first subroutine of S1 shown in FIG. 2. Step S11 calculates a fuel fall rate C by looking up from a MOFD map. Fuel fall rate C is an increase rate of the increase quantity A. FIG. 4 illustrates MOFD map employed in this example. The MOFD map is designed to determine fuel fall rate C from an engine temperature and an engine speed Ne. The example of FIG. 4 employs, as engine temperature, a cylinder wall temperature TC. As shown in FIG. 4, the fuel fall rate C increases as engine speed Ne decreases, and the fuel fall rate C increases as engine cylinder wall temperature TC becomes lower. When the engine speed becomes low, the gas motion is slower, the evaporation and atomization of fuel are poor, and the fuel is more apt to adhere to a cylinder wall The cylinder wall temperature Tc is taken into account because the volatility of the fuel is influenced by the engine temperature. In FIG. 4, the fuel fall rate C is large in a region denoted by L, and becomes small in a region denoted by S.

Figure 5:
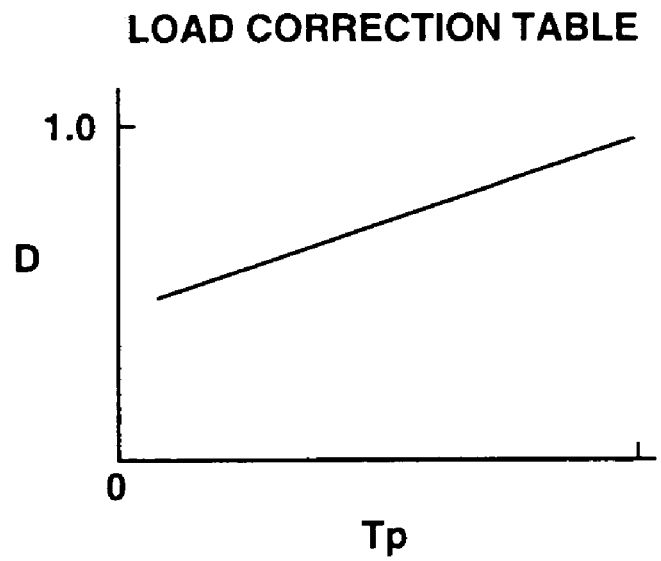
FIG. 5 is a graph illustrating a load correction table used in the first subroutine of FIG. 3.

Step S12 calculates a load correction ratio D by lookup from a load correction table. FIG. 5 illustrates the load correction table employed in this example. The load correction table is designed to determine the load correction ratio D from a base fuel injection quantity Tp which is calculated from engine speed Ne and an intake air quantity Qa, as an engine load, determined from an output of an air flowmeter 8. The load correction ratio D increases with increase in the load because the proportion of unburnt fuel becomes greater in combustion chamber 2. This is because the fuel volatility is influenced by the pressure.

Step S13 calculates the increase quantity A by using fuel fall rate C, load correction ratio D, engine speed Ne, and a fuel injection quantity Te, as engine load, determined from one or more engine operating conditions. That is; A=Te×C×D×Ne.

Figure 6:
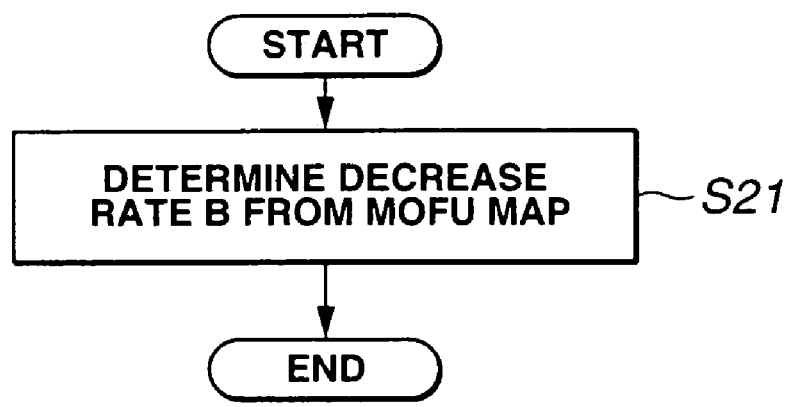
FIG. 6 is a flowchart showing a second subroutine of step S2 of FIG. 2.
Figure 7:
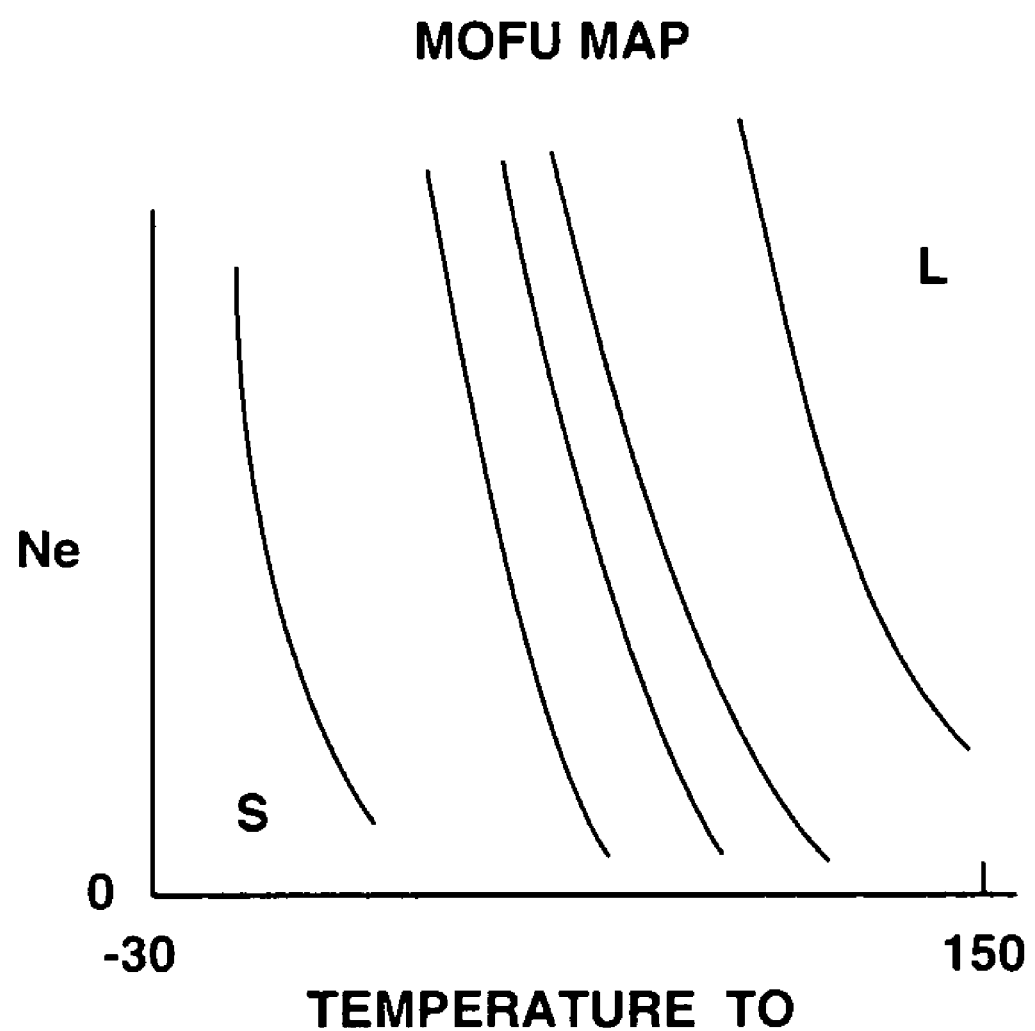
FIG. 7 is a graph illustrating a MOFU map used in the second subroutine of FIG. 6.

FIG. 6 shows the second subroutine of S2 shown in FIG. 2. Step S21 looks up in MOFU map shown in FIG. 7, and thereby calculates the decrease rate B representing an evaporation rate of the oil-diluting fuel from the engine oil. FIG. 7 shows MOFU map employed in this example. This MOFU map is designed to determine the decrease rate B from an oil temperature TO and engine speed Ne. Because of the volatility of the fuel, decrease rate B increases as oil temperature To becomes higher. As engine speed Ne increases, the decrease rate B increases because evaporation of fuel in engine oil is promoted by circulating mixing of oil with an oil pump, and oil stirring by a counterweight of a crank shaft. Decrease rate B is great in a region denoted by L in FIG. 7, and small in a region denoted by S.

Figure 8:
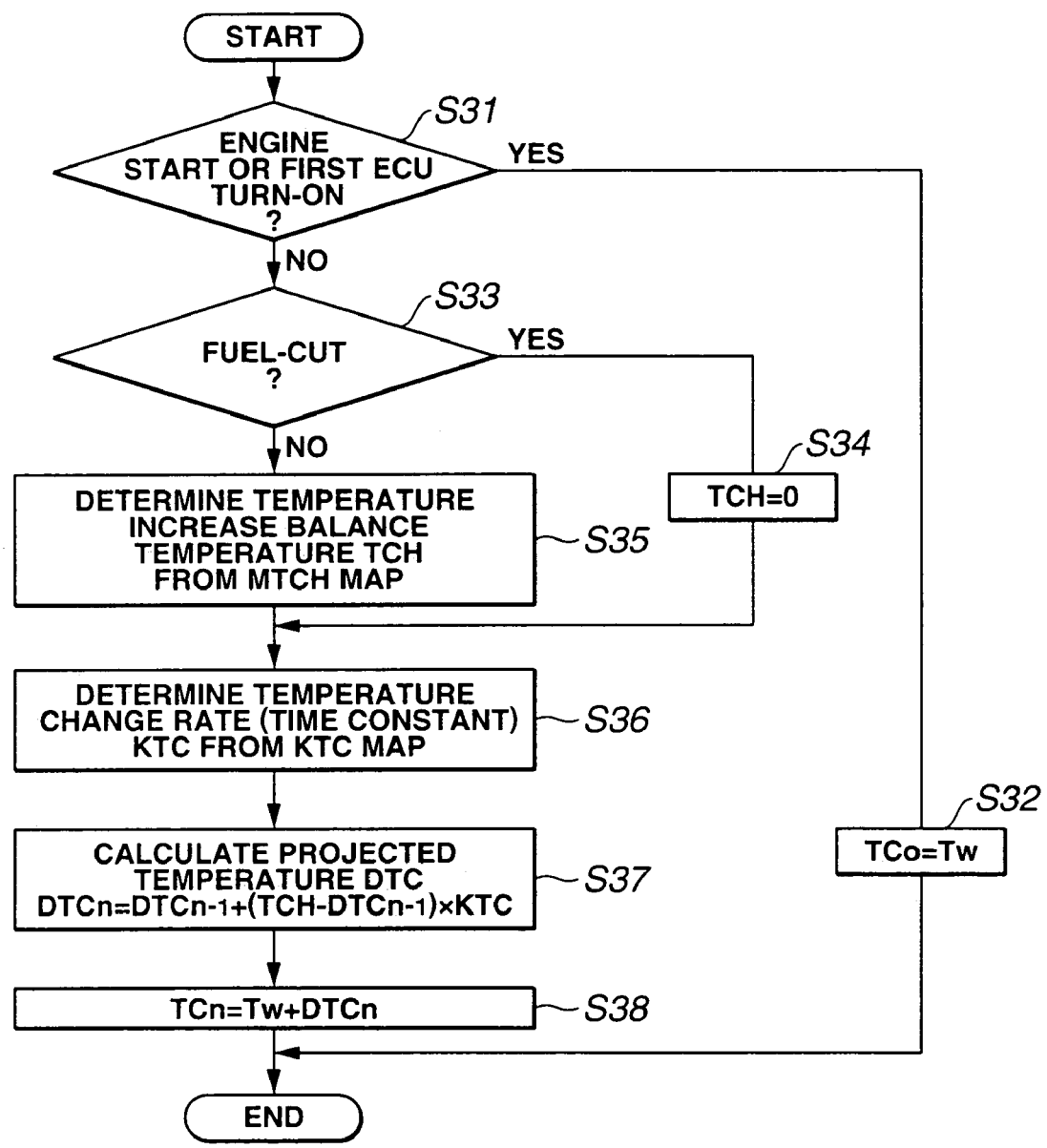
FIG. 8 is a flowchart showing a process for predicting an engine cylinder wall temperature TC which can be employed in the first subroutine.

FIG. 8 shows a process for projecting or predicting the cylinder wall temperature TC used for calculating increase quantity A. The engine system according to the first embodiment employs the process for predicting the cylinder wall temperature instead of a temperature sensor directly sensing the engine cylinder temperature.

Step S31 examines whether the engine is in an engine starting operation or in an operation first supplying electricity to ECU 12. In the case of the engine starting operation, or the first operation of supplying electricity first to ECU 12, the process proceeds from S31 to step S32. Step S32 sets an initial engine cylinder wall temperature TCo, that is an initial value of cylinder wall temperature TC, equal to an engine cooling water temperature Tw, for preparation for temperature increase in subsequent calculation cycles.

When neither of the engine starting operation and the ECU first energizing operation is detected, the process proceeds from S31 to step S33 to examine whether a fuel cutoff operation is in progress. If the engine is under the fuel cutoff operation, the process proceeds from S33 to step S34. The process proceeds from S33 to step S35 when the engine is not in the fuel cutoff state.

When the engine is in the fuel cutoff state, the cylinder wall temperature TC converges toward the engine cooling water temperature Tw. Therefore, step S34 sets a temperature increase balance temperature TCH from engine cooling water temperature Tw, equal to zero (TCH=0).

Figure 9:
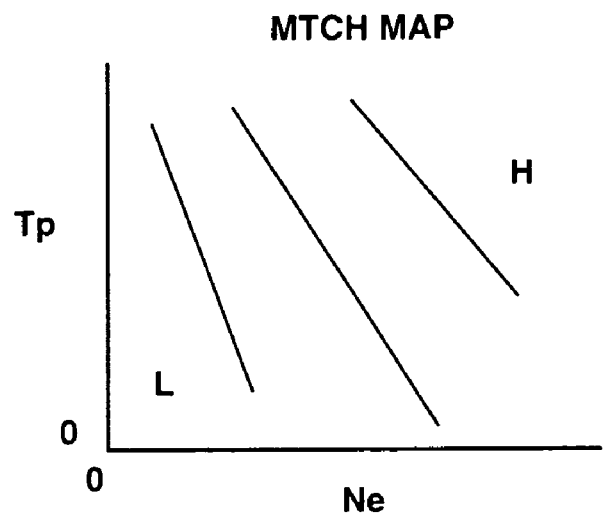
FIG. 9 is a graph illustrating a MTCH map used in the process of FIG. 8.

When, on the other hand, the engine is not in the fuel cutoff state, step S35 calculates the temperature increase balance temperature TCH by using a MTCH map shown in FIG. 9. Temperature increase balance temperature TCH represents a temperature difference between, cylinder wall temperature TC and engine cooling water temperature Tw. FIG. 9 shows MTCH map employed in this example. MTCH map is designed to determine temperature increase balance temperature TCH from engine speed Ne and base fuel injection quantity Tp. Temperature increase balance temperature TCH is strongly related to the combustion temperature. Accordingly, temperature increase balance temperature TCH increases as engine speed Ne increases, and increases as base fuel injection quantity Tp, that is engine load, increases. In FIG. 9, H stands for "high", and L for "low".

Figure 10:
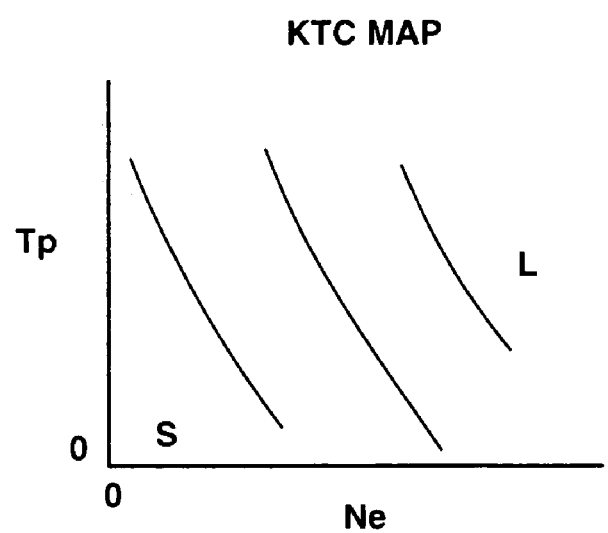
FIG. 10 is a graph illustrating a KTC map used in the process of FIG. 8.

After S35 or S34, step S36 calculates a temperature change rate KTC corresponding to a time constant of the temperature, by lookup in a KTC map shown in FIG. 10. FIG. 10 shows KTC map employed in this example. KTC map is designed to calculate the temperature change rate KTC from engine speed Ne and base fuel injection quantity Tp serving as engine load. Temperature change rate KTC receives great influence from engine speed Ne because the gas flow velocity is predominant in the heat transmission to cylinder wall. Moreover, temperature change rate KTC has a sensitivity to base fuel injection quantity Tp or the engine load because of influence on the heat transmission by the pressure. Thus, temperature change rate KTC increases as engine speed Ne increases, and as base fuel injection quantity Tp increases. In FIG. 10, L stands for "large" and S for "small".

In this example, each of the temperature increase balance temperature TCH and temperature change rate KTC is determined by using a map of engine speed Ne and base fuel injection quantity Tp. However, if the required accuracy is relatively low, it is possible to prepare calculation tables based on the intake air quantity Qa sensed by the air flow meter, respectively, for TCH and KTC, and to determine each of TCH and KTC in accordance with Qa by using the corresponding calculation table.

Step S37 following S36 determines an instantaneous projected temperature DTC from temperature increase balance temperature TCH and temperature change rate KTC. This projected temperature DTC represents a temperature difference from the engine cooling water temperature Tw. Projected temperature DTC of this example is given by: $DTCn = DTCn-1 + (TCH-DTCn-1) \times KTC$. This equation is in the form of a first order lag. Projected temperature DTC follows the temperature increase balance temperature TCH with a first order lag. The form of first order is employed because it seems that the temperature varies with a constant rate because of balance with escape of heat. Projected temperature is regarded as having a rising waveform similar to a rising waveform of a valve temperature which was measured by the inventors of the present invention. In the above equation, $DTCn-1$ is a value of the projected temperature calculated in a previous calculation cycle.

Step S38 determines the cylinder wall temperature $TCn$ by adding the projected temperature $DTCn$ determined at S37, to the engine cooling water temperature Tw ($TCn=Tw+DTCn$). Then, the process for projecting cylinder wall temperature ends. In this example, each of the temperature increase balance temperature TCH and the projected temperature DTC is an amount of temperature increase from the engine cooling water temperature Tw. Therefore, step S38 performs the addition of Tw.

In the example shown in FIG. 8, the engine cylinder wall temperature TC is predicted by calculation to the advantage of cost reduction. However, to improve the accuracy, it is optional to employ a temperature sensor embedded in the cylinder to sense the cylinder wall temperature directly.

Figure 11:
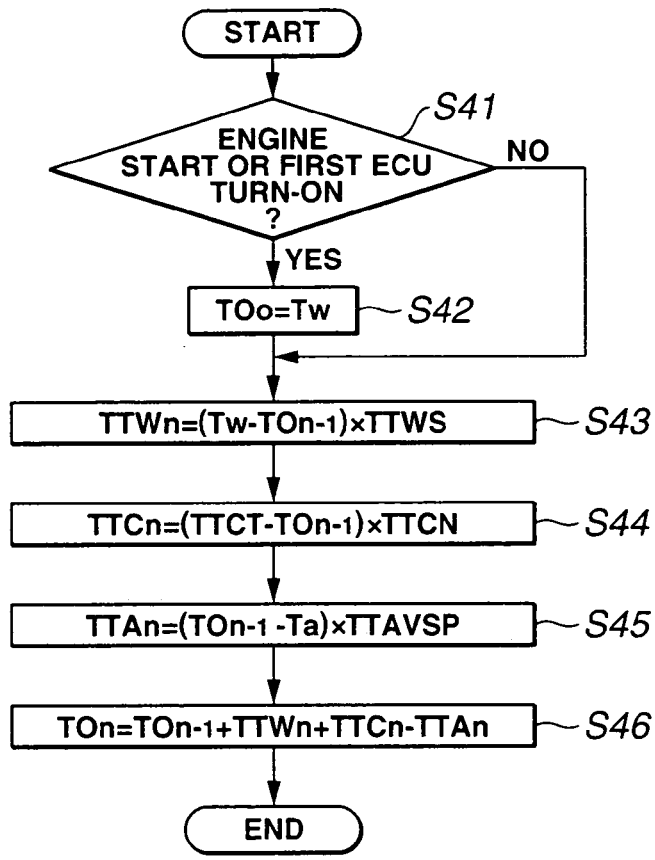
FIG. 11 is a flowchart showing a process for predicting an oil temperature TO which can be employed in the second subroutine.

FIG. 11 shows a process for projecting or predicting the oil temperature TO used for calculating the decrease rate B (the evaporation rate of oil-diluting fuel) by using MOFU map of FIG. 7.

Step S41 examines whether the engine is in the engine starting operation or in the first energy supplying operation first supplying electricity to ECU 12. In the case of the engine starting operation, or the first operation of supplying electricity first to ECU 12, the process proceeds from S41 to step S42. Step S42 sets an initial engine oil temperature TOo, that is an initial value of oil temperature TO, equal the an engine cooling water temperature Tw. When neither of the engine starting operation and the ECU first energizing operation is detected, the process proceeds from S41 directly to step S43.

Step S43 calculates a heat flow quantity TTW of the engine oil and engine cooling water, from the engine cooling water temperature Tw, TTWS, and a previous oil temperature $TOn-1$ which is a previous value of oil temperature calculated in a previous calculation cycle, by using $TTWn = (Tw-TOn-1) \times TTWS$. The heat transfer quantity is proportional to a temperature difference, and a function of a flow velocity. Therefore, in this equation, the temperature difference is multiplied by TTWS determined from engine speed Ne.

Figure 12:
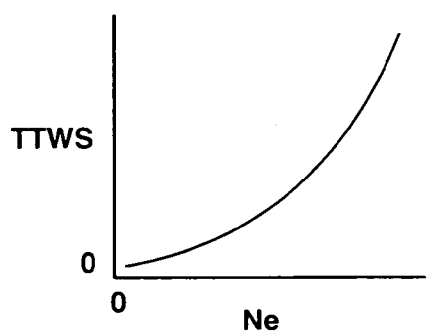
FIG. 12 is a graph illustrating a TTWS calculation table used in the process of FIG. 11.

FIG. 12 shows a TTWS calculation table employed in this example, for determining TTWS. As shown in FIG. 12, TTWS increases as engine speed Ne increases. Engine speed Ne is used for calculation of TTWS because the heat transfer among the cylinder block, cylinder head and engine oil is proportional to engine speed Ne of the engine driving the oil pump. Heat transmitted from the oil pan can be taken into account by raising the characteristic of FIG. 12 by an appropriate amount.

Step S44 calculates a heat flow quantity TTC with the combustion, from the engine cooling water temperature Tw, TTCT, TTCN and the previous oil temperature $TOn-1$, by using $TTCn = (TTCT-TOn-1) \times TTCN$.

Figure 13:
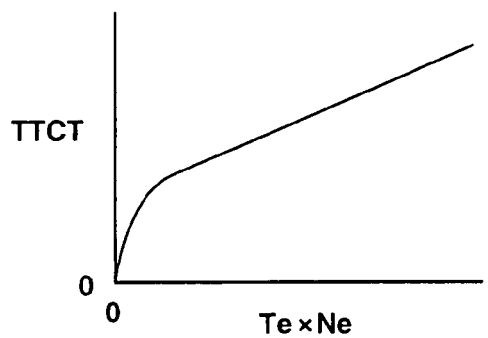
FIG. 13 is a graph illustrating a TTCT calculation table used in the process of FIG. 11.
Figure 14:
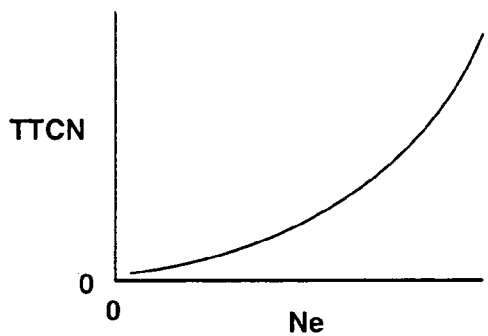
FIG. 14 is a graph illustrating a TTCN calculation table used in the process of FIG. 11.

FIG. 13 shows a TTCT calculation table employed in this example, and FIG. 14 shows a TTCN calculation table of this example. TTCT represents a piston cylinder wall temperature, and is related with the combustion temperature. Therefore, TTCN is determined from a product between fuel injection quantity Te and engine speed Ne by using the table of FIG. 13. As shown in FIG. 13, TTCT increases as the product TexNe increases. TTCN represents an engine oil flow velocity for heat transmission, and is determined from engine speed Ne by using the table of FIG. 14. As shown in FIG. 14, TTCN increases as Ne increases.

Figure 15:
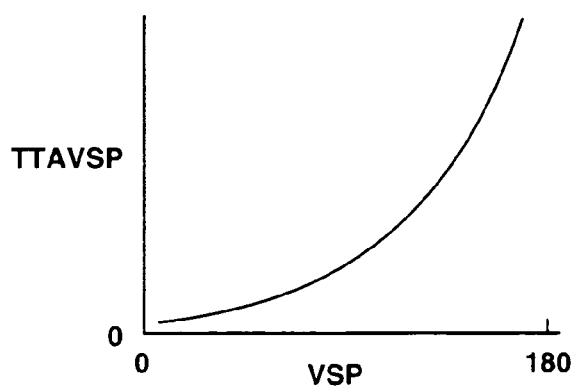
FIG. 15 is a graph illustrating a TTAVSP calculation table used in the process of FIG. 11.

Step S45 calculates a heat release quantity TTA to the outside air, according to $TTAn = (TOn-1-Ta) \times TTAVSP$. In this equation, Ta is an outside air temperature sensed by outside air temperature sensor 17, and TTAVSP is a flow velocity for heat transmission calculated from vehicle speed VSP sensed by vehicle speed sensor 18. FIG. 15 shows a TTAVSP calculation table employed in this example. TTAVSP increases as VSP increases.

Step S46 calculates the oil temperature TOn according to $TOn = TOn-1 + TTWn + TTCn - TTAn$. This equation is obtained by modeling a phenomenon in which the engine oil is warmed by the engine cooling water and the cylinder due to combustion, and cooled by wind due to vehicle movement (and engine cooling water). The thus-obtained oil temperature TO is used for calculating the evaporation rate of the oil-diluting fuel.

In the example shown in FIG. 11, the engine oil temperature TO is predicted by calculation to the advantage of cost reduction. However, to improve the accuracy, it is optional to employ a temperature sensor to sense the oil temperature directly. In the example of FIG. 11, outside air temperature Ta is used as a factor for cooling the oil pan, and warm air from a radiator is neglected. However, in the case of a vehicle in which the warm air from the radiator is influential, it is possible to improve the accuracy by modifying the outside air temperature Ta in consideration of the warm air from the radiator.

The thus-constructed oil-diluting fuel quantity estimating system according to the first embodiment can estimate the oil-diluting fuel quantity OF of fuel mixing in the engine oil, in accordance with cylinder wall temperature TC, engine speed Ne, base fuel injection quantity Tp and fuel injection quantity Te, accurately irrespective of the driving pattern and the situation.

The engine speed Ne, base fuel injection quantity Tp and fuel injection quantity Te are parameters which are already used in the existing engine control system. Besides the cylinder wall temperature TC can be estimated from engine speed Ne, fuel injection quantity Te and engine cooling water temperature Tw. Therefore, the oil-diluting fuel quantity OF is calculated by using the existing engine control system at lower cost.

Figure 16:
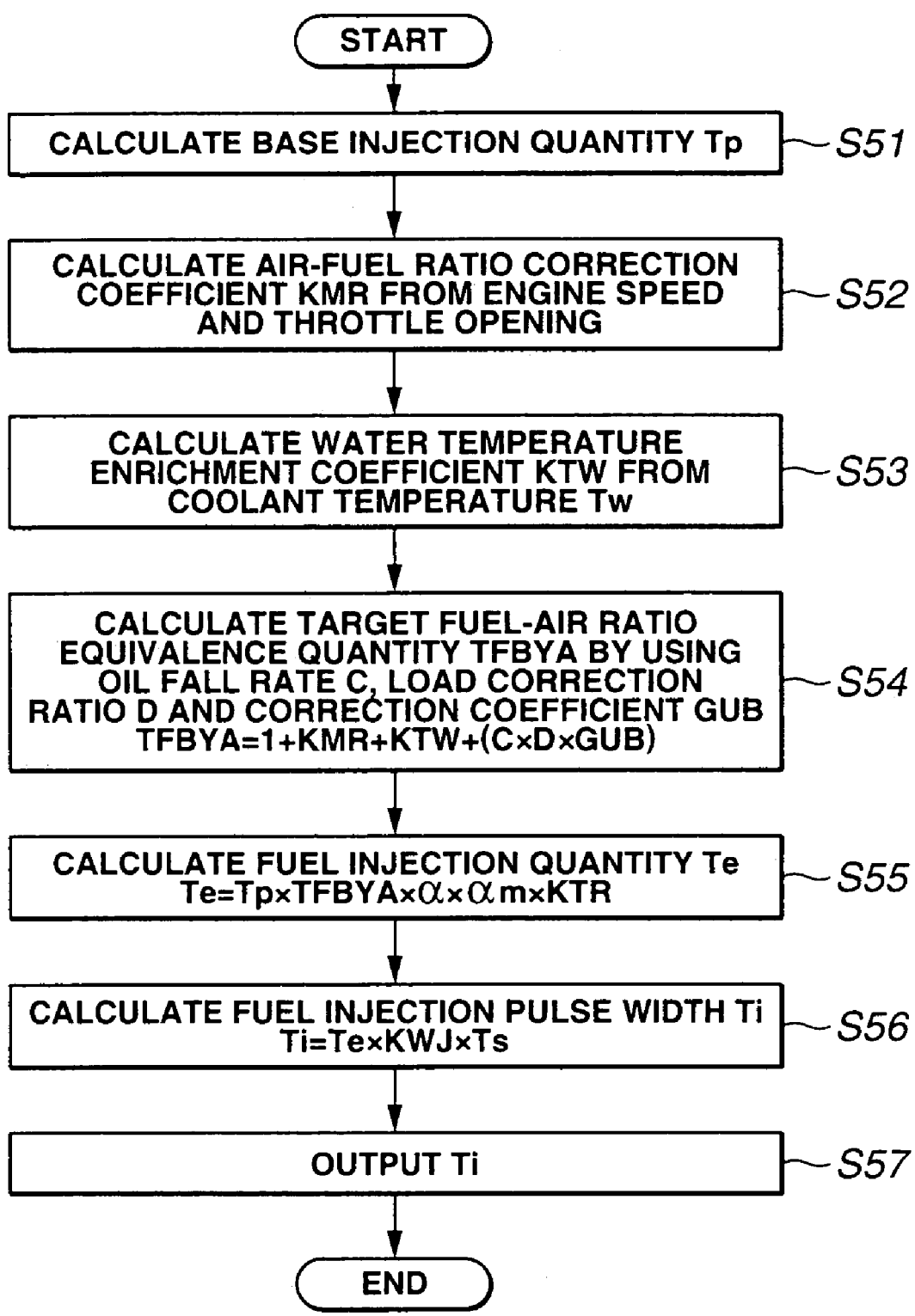
FIG. 16 is a flowchart showing an engine control process according to a second embodiment of the present invention.

FIG. 16 shows an engine control process according to a second embodiment of the present invention. An engine system according to the second embodiment is arranged to calculate the oil-diluting fuel quantity OF in the same manner as in the first embodiment, and to use the calculated oil-diluting fuel quantity OF for engine control. In the example of FIG. 16, the engine system modifies a fuel injection pulse width Ti by using oil-diluting fuel quantity OF.

Step S51 of FIG. 16 calculates the base fuel injection quantity Tp from engine speed Ne and intake air quantity Qa determined from the output signal of air flowmeter 8, by multiplying a per-engine-revolution intake air quantity (Qa/Ne) by a predetermined constant K (Tp=K×Qa/Ne). Fuel injection quantity Te is calculated on the basis of base fuel injection quantity Tp, and this base fuel injection quantity Tp is used as a representative parameter indicating the engine load.

Step S52 calculates an air fuel ratio correction coefficient KMR from engine speed Ne and a throttle valve opening degree by using a map which is stored in ECU 12.

Step S53 calculates a water temperature enrichment coefficient KTW from engine cooling water temperature, by using a map stored in ECU 12.

Step S54 calculates a target fuel air ratio equivalence quantity TFBYA by using the oil fall rate C and load correction ratio D calculated by the before-mentioned oil-diluting fuel quantity estimating system. In this example, TFBYA=1+KMR+KTR+(C×D×GUB). In this equation, GUB is set as GUB=(H1+H2)/H2 where H1 is a quantity discharged into the exhaust system, and H2 is a quantity of oil-diluting fuel. GUB is equal to about 1.6, for example. Part of fuel adherent to the cylinder wall is removed by a piston and dropped as oil-diluting fuel. Another part of the fuel adherent to the cylinder wall is discarded into the engine exhaust system without being burnt. Therefore, a predetermined constant is used as GUB for multiplication, to take into account the fuel discharged into the exhaust system without being used in combustion.

Step S55 calculates fuel injection quantity Te by using Te=Tp×TFBYA×α×αm×KTR. In this equation, α is an air fuel ratio feedback correction coefficient calculated in accordance with the output signal of oxygen sensor 13 by another flowchart distinct from the flowchart of FIG. 16. Moreover, αm is an air fuel ratio learning correction coefficient calculated in accordance with air fuel ratio feedback correction coefficient α, and KTR is a transient correction coefficient representing a correction quantity for fuel flowing on a wall.

Step S56 calculates fuel injection pulse width Ti required to inject fuel in the above-mentioned fuel injection quantity Te, by using Ti=Te×KWJ+Ts. In this equation, KWJ is an injection quantity correction coefficient, and Ts is an ineffective pulse width for correction for a difference between the energizing time of the fuel injector 11 and the actual fuel injection time.

Step S57 is a step for outputting fuel injection pulse width Ti to control fuel injector 11 to carry out the fuel injection with fuel injection pulse width Ti.

In this example, it is possible to reduce the memory capacity of ECU 12 and to reduce the manpower for adaptation, by using maps and tables for the oil-diluting fuel quantity estimation, in common for the enrichment correction for unburned fuel.

In the example of FIG. 16, fuel injection pulse width Ti is corrected in consideration of the increase quantity A of the oil-diluting fuel quantity. However, it is optional to correct the fuel injection pulse width Ti in accordance with the increase quantity A and the decrease rate B. In MTCH map (of FIG. 9) and KTC map (of FIG. 10), it is possible to use the fuel injection quantity Te in place of base fuel injection quantity Tp. In this case, the oil-diluting fuel quantity is modified in accordance with the fuel injection quantity Te actually injected for the engine.

Figure 17:
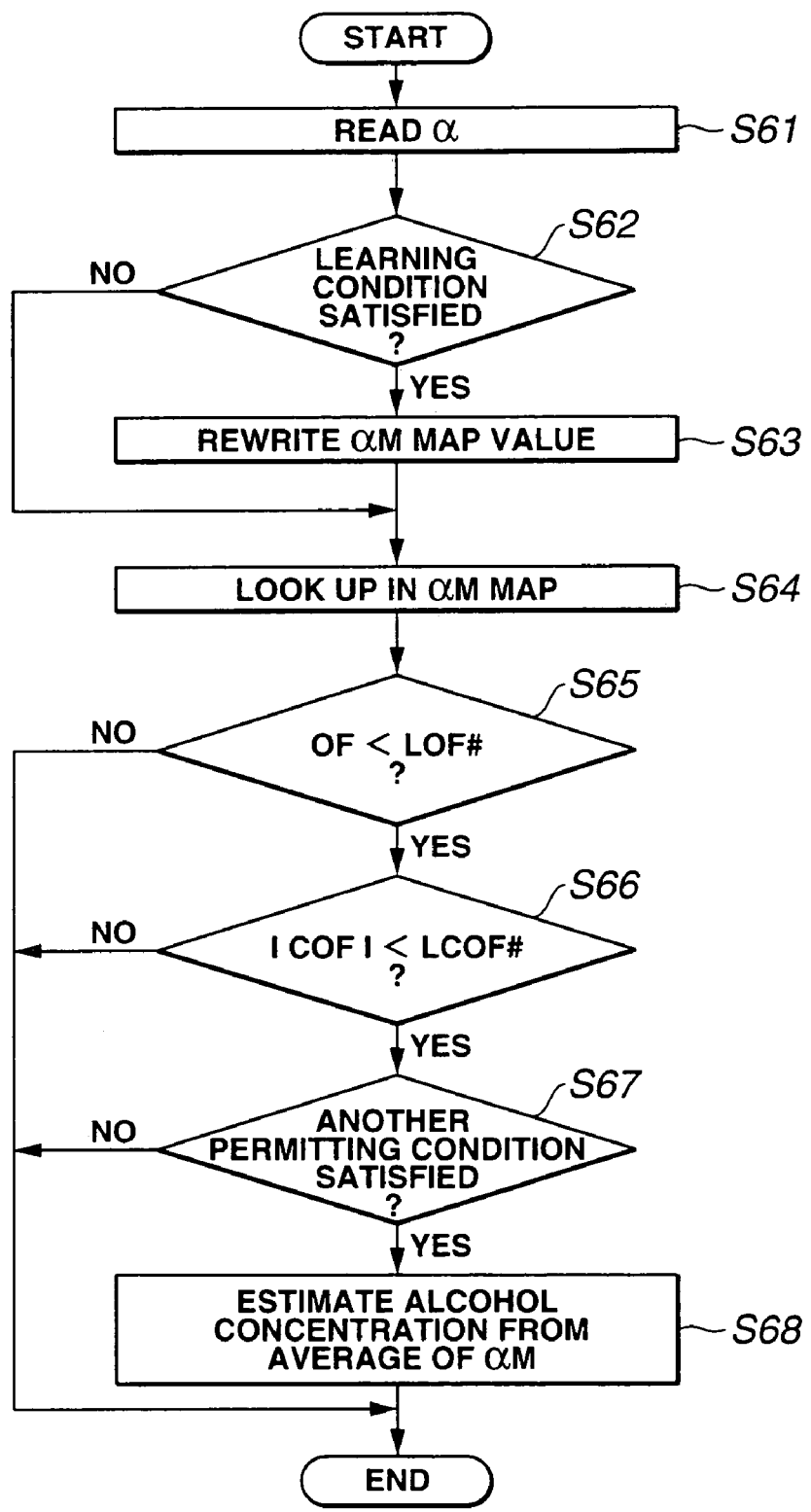
FIG. 17 is a flowchart showing an alcohol concentration estimating process according to a third embodiment of the present invention.

FIG. 17 shows a third embodiment of the present invention. Engines of many motor vehicles can burn gasoline containing alcohol of low concentration. Moreover, recently, a flexible fuel vehicle (FFV) become widely known which can be fueled not only with gasoline but with blended fuel of alcohol and gasoline as well. In the third embodiment, technique of the first and second embodiments is applied to an internal combustion engine using fuel containing alcohol.

Alcohol fuel requires a large amount of fuel injection as compared to gasoline to obtain a given equivalence ratio because of the numbers of atoms of C (carbon), H (hydrogen) and O (oxygen). Therefore, an engine system according to the third embodiment is arranged to predict the alcohol concentration of fuel accurately as quickly as possible, by utilizing the output signal of oxygen concentration sensor 13.

Earlier technology of estimating an alcohol concentration from a deviation of an equivalence ratio is insufficient in accuracy and speed of estimation, especially when fuel of a different kind is replenished. In this technology, the influence of fuel evaporated from the oil lingers, and deteriorates the accuracy of engine control based on the estimated alcohol concentration. For example, the ignition timing control is insufficient because of difference in combustion speed of fuel, and the air fuel ratio control is unsatisfactory especially in a transient state because of inadequacy in wall flow correction due to difference in volatility. Consequently, the exhaust control becomes unreliable, and the drivability becomes poor with hesitation and surge.

FIG. 17 shows a control process for estimating the alcohol concentration, performed in the engine system according to the third embodiment.

Step S61 reads the air fuel ratio feedback coefficient α calculated, in another flowchart distinct from the flowchart of FIG. 17, from the output of oxygen concentration sensor 13.

Step S62 examines whether a learning condition is satisfied or not. When the learning condition is satisfied, the process proceeds to step S63, rewrites a map value in an αm calculation map for each operating region at S63, and then proceeds to step S64. When the learning condition is not satisfied, the process proceeds directly to S64 without performing the map rewriting operation of S63.

Step S64 determines a value of αm in each operating region by lookup in the current αm map for each operating region.

Then, step S65 examines whether the oil-diluting fuel quantity OF calculated in the flowchart of FIG. 2 is smaller than a predetermined estimation permitting dilution quantity LOF#.

Step 566 is reached when OF<LOF#, and examines whether the absolute value of the variation quantity COF calculated in the flowchart of FIG. 2 is smaller than a predetermined estimation permitting dilution variation quantity LCOF#.

When both conditions of S65 and S66 are met (that is, OF is smaller than a desired value (LOF#) and |COF| is smaller than a desired value (LCOF#)), the process enters a path permitting the alcohol concentration estimation on the assumption that the influence of fuel evaporated from engine oil is little. In the example of FIG. 17, another permitting condition is checked at step S67 about the engine cooling water temperature, an elapsed time after a start of the engine, an operating condition of an air fuel ratio learning control, and the record of past refueling. When the first, second and third conditions of S65, S66 and S67 are met, the process proceeds to step S68, and estimates the alcohol concentration at S68.

Step S68 calculates an average of αm values in representative speed load regions. In this example, the average of αm is determined from the values of four speed load regions, and the alcohol concentration is calculated from the result by using a table shown in FIG. 18. It is desirable to select, as the representative four regions, regions which are used relatively frequently by the engine, and in which the intake air quantity is not so small. By so doing, it is possible to maintain a sufficient frequency of the learning, and the influence of oil-diluting fuel evaporating from engine oil is lowered by selecting a region having a relatively large intake air quantity.

Figure 18:
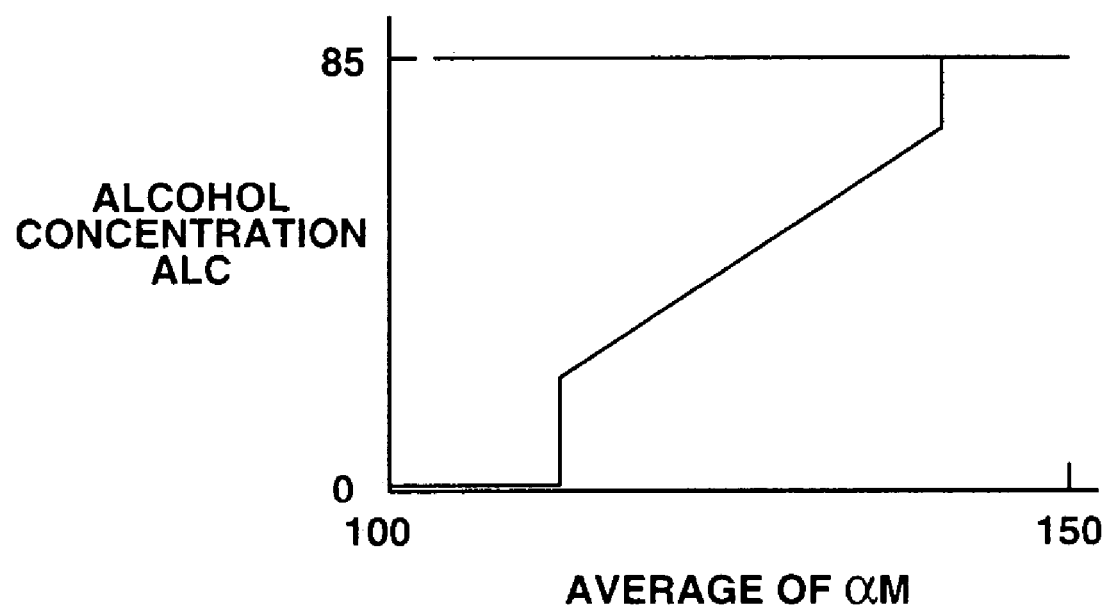
FIG. 18 is a graph illustrating an alcohol concentration calculating table used in the process of FIG. 17.

The characteristic shown in FIG. 18 has a dead band in which the alcohol concentration ALC is not changed with respect to changes in the average of αm. The dead band is provided to use a stable control value (a control constant) when gasoline is inserted or when a standardized blended fuel (gasoline-alcohol fuel) is always inserted. The above-mentioned control value (control constant) includes at least one of control constant about the ignition timing, constant about correction of wall flow of fuel, constant about ternary point adjustment of lambda control, and constant about cold enrichment. The dead band is provided because the repeatability of emission becomes poor if these are varied.

In this way, the engine system according to the third embodiment can estimate the alcohol concentration of the fuel quickly, and provide a flexible fuel vehicle having good drivability and emission performance.

Figure 19:
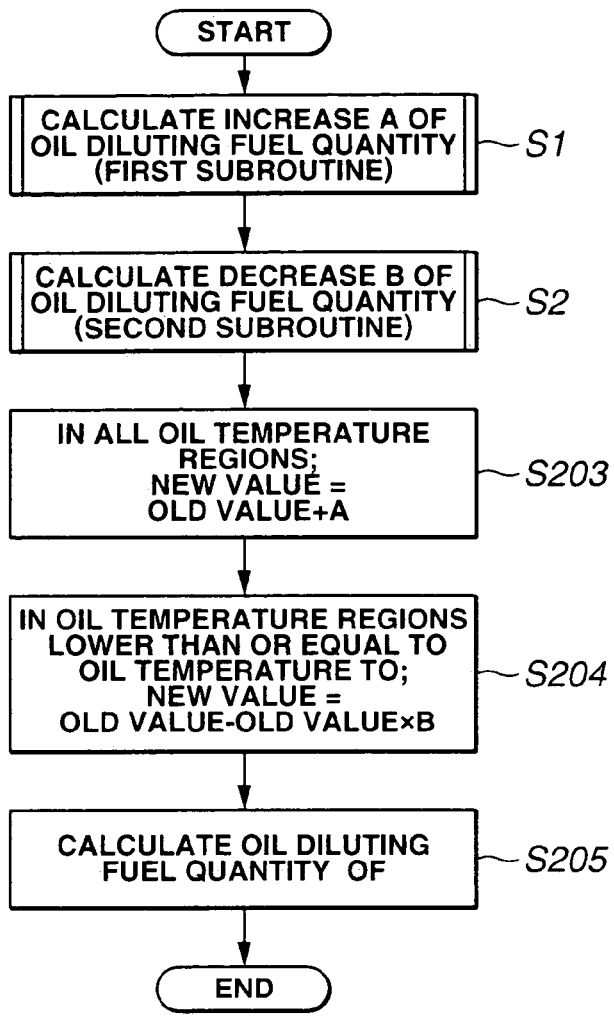
FIG. 19 is a flowchart showing an oil-diluting fuel quantity estimating process according to a fourth embodiment of the present invention.
Figure 20:
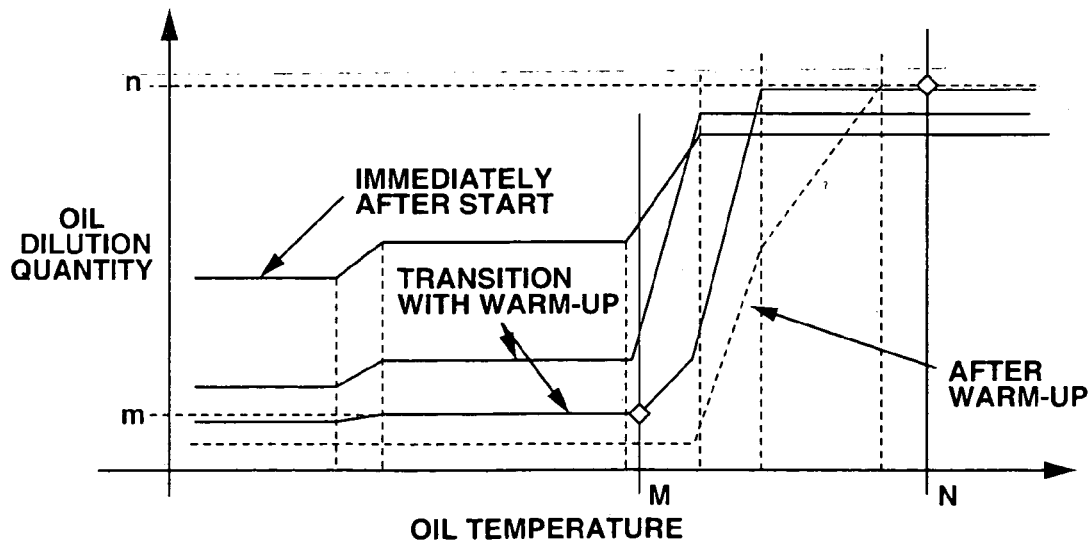
FIG. 20 is a graph illustrating an oil-diluting fuel quantity table TOF used in the estimating process of FIG. 19.

FIGS. 19 and 20 shows an oil-diluting fuel quantity estimating process performed by an estimating system according to a fourth embodiment of the present invention. In the fourth embodiment, an engine system is constructed in the same manner as in the preceding embodiments as shown in FIG. 1.

When part of fuel adheres to a cylinder inside wall surface and leaks through a clearance between the piston and cylinder during an engine operation, the engine oil is diluted by the leakage fuel. In case of such dilution, the amount of fuel to be burned in combustion chamber 2 is decreased, and the air fuel ratio might become so lean (air rich) as to exert adverse influence on the drivability and emission control. Moreover, if the oil-diluting fuel evaporates from the engine oil and enters the intake system by being sucked through a blowby system, the air fuel ratio might become so rich (fuel rich) as to exert adverse influence on the drivability and emission control.

The increase of the oil-diluting fuel becomes lower as the engine temperature (the temperature in the combustion chamber) becomes higher. On the other hand, gasification or evaporation of the oil-diluting fuel is promoted as the engine temperature (the oil temperature) becomes higher. However, the evaporation of the oil-diluting fuel differs among components (light component and heavy component) of the fuel. A light component starts evaporating from engine oil from a relatively low temperature. On the other hand, a heavy component of fuel mixed in oil can not readily evaporate even at relatively high temperatures. Therefore, the oil-diluting fuel quantity in the engine oil is varied in dependence on the history of the oil temperature after a start of the engine.

The volatility of fuel mixed in engine oil ranges widely from a boiling point of 30° C. to 150° C. A less volatile component of fuel having a high boiling point tends to remain unburned and un-evaporated in engine oil, and does not evaporate until the engine oil temperature becomes sufficiently high. Therefore, a significant amount of fuel exists in the oil, even after engine warm-up, at oil temperatures near the water temperature. When the oil temperature becomes higher in a hill climbing operation, for example, such fuel is evaporated and sucked into the engine again, and becomes a factor for causing errors in the air fuel ratio control such as error in the learning control of the air fuel ratio and error in the diagnosis in a diagnostic system for the fuel system.

FIG. 19 shows a process for determining an oil-diluting fuel quantity OF, according to the fourth embodiment of the present invention. This process is performed at regular time intervals of a predetermined time length.

Steps S1 and S2 of FIG. 19 are substantially identical to S1 and S2 shown in FIG. 2. Step S1 calculates the increase quantity (or increase) A of an oil-diluting fuel quantity according to the first subroutine as mentioned before. Step S2 calculates the decrease rate (the rate of evaporation) B of the oil-diluting fuel quantity according to the second subroutine as mentioned before.

Steps S203 and S204 are arranged to update the contents (indicators) of an oil-diluting fuel quantity table TOF arranged in accordance with the oil temperature TO, by using the increase quantity A determined at S1 and the decrease rate B determined at S2.

FIG. 20 is a graph for illustrating the oil-diluting fuel quantity table TOF schematically. In this example, a plurality of oil temperature regions or divisions are set from 0 (° C.) so that each region has a temperature range of 10 (° C.). Each oil temperature region has a temperature component oil-diluting fuel quantity (oil-diluting fuel index). The entire oil-diluting fuel quantity OF is determined by the summatioies (oil-diluting fuel indexes). That is, the oil-diluting fuel quantity OF is estimated from the area between a characteristic line shown in FIG. 20 and an abscissa (horizontal axis). In this example, the oil temperature regions correspond to (soft or heavy) components of the oil-diluting fuel. The indexes in the higher oil temperature regions on the right hand in FIG. 20 represents the residual quantities of heavier components (having higher boiling points and being less volatile).

As shown in FIG. 20, the temperature component oil-diluting fuel quantities of the temperature regions (or the quantities of temperature components of the oil) are varied by the history of variation of the oil temperature after a start of the engine. Immediately after an engine start, the soft components of the oil-diluting fuel increase. At relatively low temperatures, the oil-diluting fuel quantity tends to decrease because the amount of evaporation of softer components is greater than the amount of accumulation of heavier components of the oil-diluting fuel. After an end of an engine warm-up, the characteristic is changed, as the results of steps S203 and 5204, to the form in which the quantity of the oil-diluting fuel which can evaporate is decreased to a level of m because of softer components being fully evaporated until the oil temperature reaches M (° C.). However, the quantity of the heavier components is still great. So, the quantity of the oil-diluting fuel which can evaporate is increased to a level of n when the temperature increases to a level of N (° C.) after the engine start.

Therefore, step S203 adds the increase quantity A calculated at S1, to all the oil temperature regions. Then, step S204 updates the index in each of the temperature regions lower than or equal to the current oil temperature TO, according to [New value]=[Old value]−[Old value]×B. The new value is an updated value of the temperature component oil-diluting fuel quantity, and the old value is a previous value of the temperature component oil-diluting fuel quantity before the updating.

This oil-diluting fuel quantity table of this example is saved, as battery backup, in a memory which does not lose its contents even when the engine is stopped. The oil-diluting fuel quantity is stored irrespective of the number of engine starts.

Step S205 calculates oil-diluting fuel quantity OF by using the oil-diluting fuel quantity table TOF updated by steps S203 and S204, by summing all the indexes of the oil temperature regions.

FIGS. 3~15 and related explanations are applicable to the fourth embodiment, too.

The oil-diluting fuel quantity estimating system of FIG. 19 can monitor the mixing and evaporating conditions of the oil-diluting fuel in each of the temperature regions, and thereby estimates the oil-diluting fuel quantity without adverse influence from the history of engine operation and the history of environment changes.

The oil-diluting fuel quantity estimating system of FIG. 19 is arranged to vary the temperature region oil-diluting fuel quantity (or oil-diluting fuel quantity estimation index) of each temperature region in accordance with the engine temperature. Therefore, the system can estimate the oil-diluting fuel quantity accurately. In this example, the system decreases the temperature region oil-diluting fuel quantities (or oil-diluting fuel quantity estimation indexes) of the temperature regions equal to or lower than the current oil temperature, and thereby detects the conditions in which the evaporation of oil-diluting fuel is less.

The increase quantity A of the oil-diluting fuel quantity is added to all the temperature regions without regard to the current temperature. The estimation system can detect the condition of slow evaporation of oil-diluting fuel even by such a uniform addition without regard to the distribution of volatility of gasoline fuel. When the accuracy is to be further improved, it is possible to predict fuel components remaining unburned and to increase the table values in accordance with the distribution of evaporation temperature. However, the unburned components are largely influenced by the operating conditions, and it is not easy to improve the accuracy by this technique. With uniform addition, the system of the example of FIG. 19 estimates the oil-diluting fuel quantity at a slightly larger value in a direction not leading to erroneous learning.

Instead of the decreasing operation of S204 in FIG. 19, it is optional to decrease the indexes of the temperature regions higher than the current temperature by smaller amounts and to decrease the indexes of the temperature regions lower than the current temperature by larger amounts. By so doing, the estimating system can treat the amount of fuel which can vaporize below a boiling point.

The results of oil diluting fuel quantity estimating method of FIG. 19 can be used for an engine control system, such as a fuel injection quantity control system, as in the second embodiment of FIG. 16.

Figure 21:
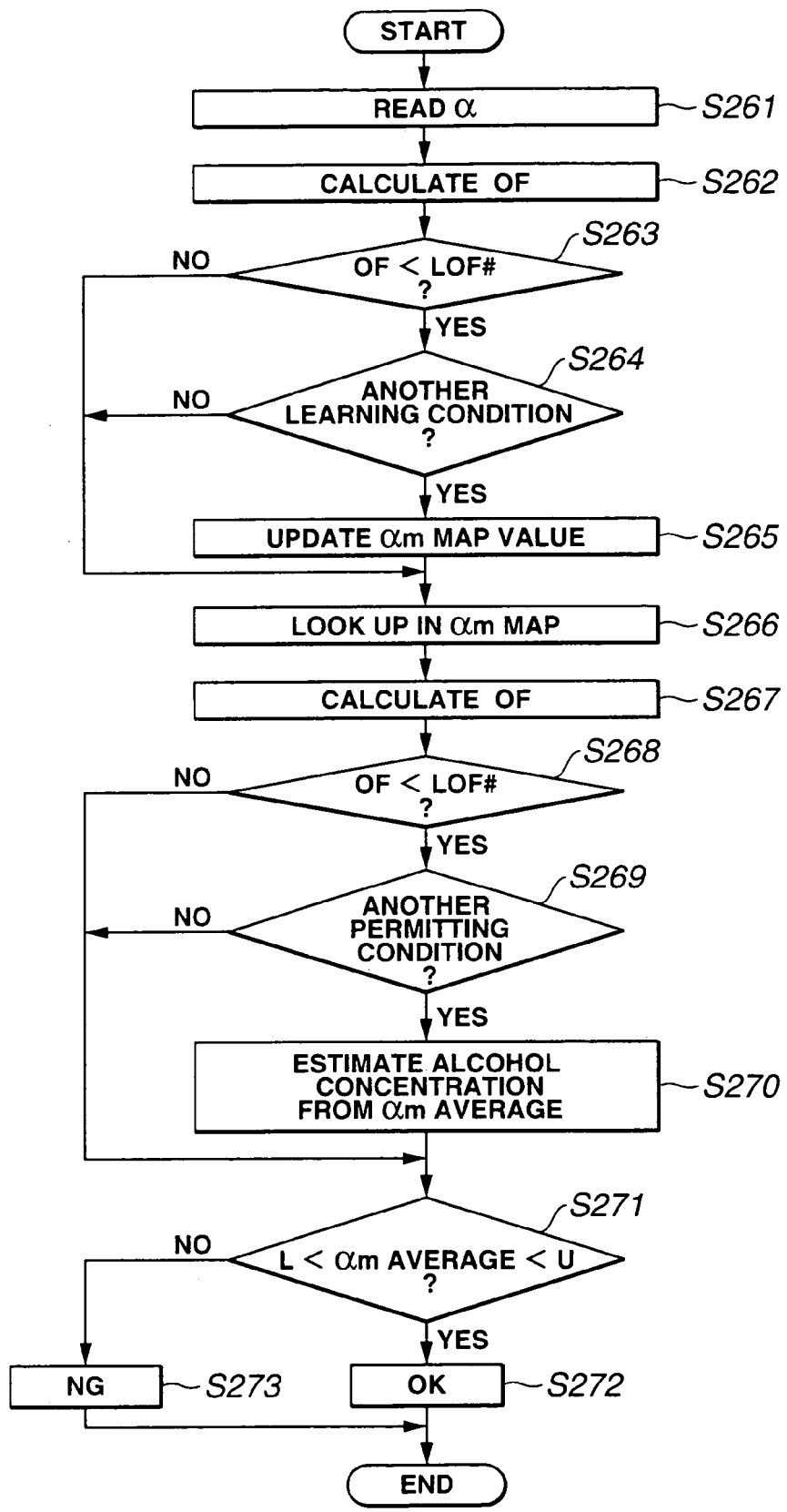
FIG. 21 is a flowchart showing an alcohol concentration estimating process according to a fifth embodiment of the present invention.
Figure 22:
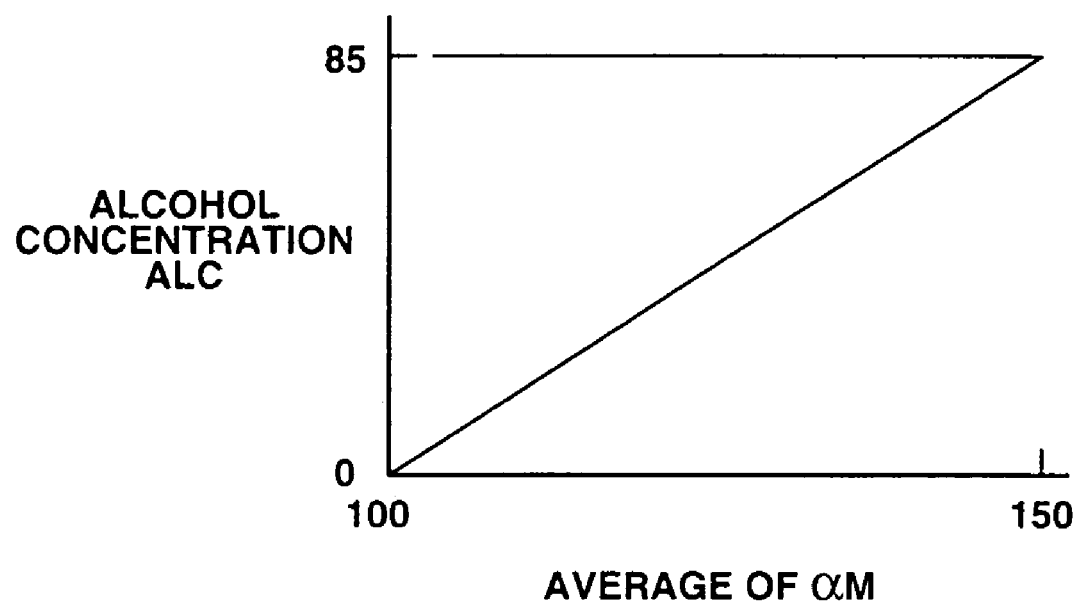
FIG. 22 is a graph illustrating an alcohol concentration calculating table used in the process of FIG. 21.

FIGS. 21 and 22 show a fifth embodiment of the present invention. A flowchart shown in FIG. 21 is somewhat similar to the flowchart of FIG. 17 according to the third embodiment.

Step S261 reads an air fuel ratio feedback correction coefficient a calculated, in another flowchart distinct from the flowchart of FIG. 21, from the output of oxygen concentration sensor 13.

Step S262 calculates the oil-diluting fuel quantity OF at a current temperature, from oil temperature TO by using oil-diluting fuel quantity table TOF of the fourth embodiment.

Step S263 examines whether the oil-diluting fuel quantity OF calculated at S262 is smaller than a predetermined estimation permitting dilution quantity LOF#. The process proceeds to step S264 if OF<LOF#, and to a step S66 if OF≧LOF#.

Step S264 checks if another leaning condition is satisfied or not. The prohibition of learning or updating of learning values is determined not only by the oil-diluting fuel quantity OF, but various other factors as well. For example, the learning is prohibited in the case of low water temperature, overheating, α feedback control, canister purge cut, purge concentration being low, or acceleration.

Step S265 updates a map value in an αm calculating map. Step S266 determines a value of αm in each operating region by lookup in the current αm map for each operating region.

Step S67 calculates the oil-diluting fuel quantity OF at the current temperature, from oil temperature TO by using oil-diluting fuel quantity table TOF.

Then, step S268 examines whether the oil-diluting fuel quantity OF calculated at S267 is smaller than a predetermined estimation permitting dilution quantity LOF#.

When the condition of S268 is met (that is, OF is smaller than a desired value (LOF#), the process enters a path permitting the alcohol concentration estimation on the assumption that the influence of fuel evaporated from engine oil is little. In the example of FIG. 21, another permitting condition is checked at step S269 about the engine cooling water temperature, an elapsed time after a start of the engine, an operating condition of an air fuel ratio learning control, and the record of past refueling. When the these conditions are met, the process proceeds to step S270, and estimates the alcohol concentration at S270.

Step S270 calculates an average of αm values in representative speed load regions. In this example, the average of αm is determined from the values of four speed load regions, and the alcohol concentration is calculated from the result by using a table shown in FIG. 22. It is desirable to select, as the representative four regions, regions which are used relatively frequently by the engine, and in which the intake air quantity is not so small. By so doing, it is possible to maintain a sufficient frequency of the learning, and the influence of oil-diluting fuel evaporating from engine oil is lowered by selecting a region having a relatively large intake air quantity.

Step S271 performs a diagnosis of the fuel system by using the average of αm. In this example, S271 compares the average of αm with an upper limit value U and a lower limit value L, to determine whether the average of αm in the range greater then the lower limit value L and smaller than the upper limit value U. When the average of αm is greater than the lower limit value L and at the same time smaller than the upper limit value U, then the process proceeds from S271 to step S272 to conclude that the system is in a good condition (OK). If the average of αm is smaller than or equal to the lower limit value or the average is greater than or equal to the upper limit, then the process proceeds from S271 to step S273, and performs an operation to indicate that the system is not in the normal state (NG). This diagnostic system checks the condition of the air flowmeter, fuel injectors or other parts determining the fuel flow rate, by using the air fuel ratio learning correction coefficient αm as the learning value. In this example, the lower limit value is set equal to 80, the upper limit value is 180, and step S271 examines whether the average of αm is greater than 80, and smaller than 180.

The system according to the fifth embodiment is arranged to permit the estimation of the alcohol concentration, the air fuel ratio learning control and the fuel system diagnosis when the oil-diluting fuel quantity is smaller than the predetermined estimation permitting dilution quantity LOF#, and hence the amount of fuel evaporation is small and noninfluential on the variation of the air fuel ratio. By using the thus-obtained air fuel ratio learning coefficientαm and oil-diluting fuel quantity, the system according to the fifth embodiment can control the engine accurately without being influenced by the evaporation of the oil-diluting fuel, to the advantage of the emission control and the drivability.

In the illustrated examples of the embodiments according to the present invention, at least one of steps S1, S2, S3, S203, and S204 corresponds to a variation calculating section to calculate a variation, such as quantity A, B or COF, of an engine oil-diluting fuel; and at least one of steps S4 and S205 corresponds to an oil-diluting fuel quantity calculating section to determine an oil-diluting fuel quantity in accordance with the variation. Step S1 corresponds to an increase calculating section to calculate an increase quantity such as quantity A of the engine oil-diluting fuel quantity; and step S2 corresponds to a decrease calculating section to calculate a decrease quantity such as B or B×OFn−b 1 of the engine oil-diluting fuel quantity. At least one of sensors 15, 16 and 8 corresponds to an input section to sense an engine operating condition such as engine temperature (TC, TO or Tw), engine speed Ne or engine load. ECU 12 corresponds to a control unit to calculate a variation of an engine oil-diluting fuel, to determine an oil-diluting fuel quantity in accordance with the variation, and to produce a control signal by using the oil diluting fuel quantity. An actuating device such as fuel injector 11 can correspond to an output section to control the engine in response to the control signal. At least one of S1, S2, S3, S203, S204 corresponds to means for calculating a variation of an engine oil-diluting fuel quantity successively in accordance with an engine temperature. Step S4 or S205 corresponds to means for determining the oil-diluting fuel quantity in accordance with successively calculated values of the variation.

This application is based on a prior Japanese Patent Application No. 2002-302614 filed on Oct. 17, 2002, and a prior Japanese Patent Application No. 2002-364742 filed on Dec. 17, 2002. The entire contents of these Japanese Patent Applications Nos. 2002-302614 and 2002-364742 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An apparatus for an internal combustion engine, comprising:
   a variation calculating section to calculate a variation of an engine oil-diluting fuel which is fuel leaking out through a clearance between a piston and a cylinder of the engine and diluting an engine oil; and
   an oil-diluting fuel quantity calculating section to determine an oil-diluting fuel quantity in accordance with the variation.

2. The apparatus as claimed in claim 1, wherein the variation calculating section calculates the variation in accordance with an engine temperature.

3. The apparatus as claimed in claim 1, wherein the variation calculating section comprises an increase calculating section to calculate an increase quantity of the engine oil-diluting fuel quantity, and a decrease calculating section to calculate a decrease quantity of the engine oil-diluting fuel quantity; and the oil-diluting fuel quantity calculating section calculates the oil-diluting fuel quantity in accordance with the increase quantity and the decrease quantity.

4. The apparatus as claimed in claim 3, wherein the increase calculating section calculates the increase quantity of the engine oil-diluting fuel quantity in accordance with an engine temperature, an engine speed and an engine load.

5. The apparatus as claimed in claim 4, wherein the engine temperature is an engine cylinder wall temperature.

6. The apparatus as claimed in claim 3, wherein the decrease calculating section calculates the decrease quantity of the engine oil-diluting fuel quantity in accordance with an engine temperature, and an engine speed.

7. The apparatus as claimed in claim 6, wherein the engine temperature is an engine oil temperature.

8. The apparatus as claimed in claim 3, wherein the decrease calculating section calculates a decrease rate which is a rate of decrease of the oil-diluting fuel quantity, and which represents a rate of evaporation of the oil-diluting fuel, to determine the decrease quantity in accordance with the decrease rate.

9. The apparatus as claimed in claim 1, wherein the oil-diluting fuel quantity calculating section calculates the oil-diluting fuel quantity by integrating the variation.

10. The apparatus as claimed in claim 9, wherein the variation calculating section determines a value of the variation periodically, and the oil-diluting fuel quantity calculating section calculates the oil-diluting fuel quantity by adding a current value of the variation to a previous value of the oil-diluting fuel quantity.

11. The apparatus as claimed in claim 9, wherein the variation calculating section comprises an increase calculating section to calculate an increase quantity of the engine oil-diluting fuel quantity, and a decrease calculating section to calculate a decrease quantity of the engine oil-diluting fuel quantity; and the oil-diluting fuel quantity calculating section calculates the oil-diluting fuel quantity by integrating the increase quantity and the decrease quantity.

12. The apparatus as claimed in claim 11, wherein the increase calculating section calculates the increase quantity of the engine oil-diluting fuel quantity in accordance with an engine cylinder wall temperature, an engine speed and an engine load, and wherein the decrease calculating section calculates the decrease quantity of the engine oil-diluting fuel quantity in accordance an engine oil temperature and the engine speed.

13. The apparatus as claimed in claim 1, wherein the variation calculating section determines an oil-diluting temperature component quantity for each of engine temperature regions, and the oil-diluting fuel quantity calculating section calculates the oil-diluting fuel quantity from the oil-diluting temperature component quantities.

14. The apparatus as claimed in claim 13, wherein the variation calculating section varies the oil-diluting temperature component quantity of each temperature region in accordance with an engine temperature.

15. The apparatus as claimed in claim 14, wherein the variation calculating section comprises an increase calculating section to calculate an increase quantity of the engine oil-diluting fuel quantity, and a decrease calculating section to calculate a decrease quantity of the engine oil-diluting fuel quantity; and the oil-diluting fuel quantity calculating section updates a collection of the oil-diluting temperature component quantities in accordance with the increase quantity and the decrease quantity, and calculates the oil-diluting fuel quantity by using the collection updated.

16. The apparatus as claimed in claim 15, wherein the increase calculating section calculates the increase quantity of the engine oil-diluting fuel quantity in accordance with an engine cylinder wall temperature, an engine speed and an engine load, and wherein the decrease calculating section calculates the decrease quantity of the engine oil-diluting fuel quantity in accordance an engine oil temperature and the engine speed.

17. The apparatus as claimed in claim 15, wherein the oil-diluting fuel quantity calculating section adds the increase quantity to each of the oil-diluting temperature component quantities in the collection.

18. The apparatus as claimed in claim 15, wherein the oil-diluting fuel quantity calculating section decreases the oil-diluting temperature component quantity of each temperature region if the temperature region is a region lower than or equal to a current engine temperature.

19. The apparatus as claimed in claim 1, wherein the apparatus further comprises a condition discriminating section to check the oil-diluting fuel quantity to determine whether a predetermined permitting condition is satisfied, and an alcohol concentration calculating section to calculate an alcohol concentration of a fuel when the permitting condition is satisfied.

20. The apparatus as claimed in claim 19, wherein the permitting condition is satisfied when the oil-diluting fuel quantity is smaller than or equal to a predetermined value.

21. The apparatus as claimed in claim 19, wherein the permitting condition is satisfied when at least one of first and second conditions is satisfied, the first condition being a condition which is satisfied when the oil-diluting fuel quantity is smaller than or equal to a predetermined value, the second condition is a condition which is satisfied when the variation of the oil-diluting fuel quantity is smaller than or equal to a predetermined variation value.

22. The apparatus as claimed in claim 1, wherein the oil-diluting fuel quantity calculating section modifies the oil-diluting fuel quantity in accordance with a fuel injection quantity of fuel injected into the engine.

23. The apparatus as claimed in claim 1, wherein the apparatus comprises an engine control section to control the engine in accordance with the oil-diluting fuel quantity.

24. The apparatus as claimed in claim 23, wherein the engine control section adjusts a fuel injection quantity in accordance with the oil-diluting fuel quantity.

25. A process for an internal combustion engine, the process comprising:
    calculating a variation of an engine oil-diluting fuel which is fuel leaking out through a clearance between a piston and a cylinder of the engine and diluting an engine oil; and
    determining an oil-diluting fuel quantity in accordance with the variation.

26. An engine control system of an internal combustion engine, the system comprising:
    an input section to sense an engine operating condition;
    a control unit to calculate a variation of an engine oil-diluting fuel which is fuel leaking out through a clearance between a piston and a cylinder of the engine and diluting an engine oil, to determine an oil-diluting fuel quantity in accordance with the variation, and to produce a control signal by using the oil diluting fuel quantity; and
    an output section to control the engine in response to the control signal.

27. An apparatus for an internal combustion engine, the apparatus comprising:
    means for calculating a variation of an engine oil-diluting fuel quantity successively in accordance with an engine temperature; and
    means for determining the oil-diluting fuel quantity in accordance with successively calculated values of the variation.

* * * * *